US012469370B2

(12) United States Patent
Kim

(10) Patent No.: US 12,469,370 B2
(45) Date of Patent: Nov. 11, 2025

(54) COMMUNICATION LAMP SYSTEM

(71) Applicant: HYUNDAI MOBIS CO., LTD., Seoul (KR)

(72) Inventor: Myeong Je Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 75 days.

(21) Appl. No.: 18/545,353

(22) Filed: Dec. 19, 2023

(65) Prior Publication Data
US 2024/0386786 A1   Nov. 21, 2024

(30) Foreign Application Priority Data

May 16, 2023 (KR) .................. 10-2023-0063131

(51) Int. Cl.
*G08B 7/00* (2006.01)
*H05B 47/12* (2020.01)
(52) U.S. Cl.
CPC ............... *G08B 7/00* (2013.01); *H05B 47/12* (2020.01)

(58) Field of Classification Search
CPC . G08B 7/00; G08B 7/06; H05B 47/12; B60Q 1/0017; B60Q 1/549; B60Q 1/547; B60Q 5/00; B60Q 2400/50; B60Y 2306/11; H04R 3/00; H04R 17/00
See application file for complete search history.

(56) References Cited

U.S. PATENT DOCUMENTS

| 11,320,829 | B2 | 5/2022 | Ekin | |
| 2014/0146557 | A1* | 5/2014 | Dums | F21S 41/285 362/520 |
| 2021/0153574 | A1* | 5/2021 | Greszler | G08B 21/02 |
| 2022/0013710 | A1* | 1/2022 | Miyoshi | H10N 30/883 |

* cited by examiner

Primary Examiner — Bao Q Truong
(74) Attorney, Agent, or Firm — NSIP Law

(57) ABSTRACT

A communication lamp system is provided. The system includes a light source unit including a lens and a light source, a piezoelectric element for generating an electrical acoustic signal based on sound, and a processor to control the light source device or the piezoelectric element, and control the light source unit based on the electrical acoustic signal received from the piezoelectric element.

16 Claims, 17 Drawing Sheets

COMMUNICATION LAMP SYSTEM

CROSS-REFERENCE TO RELATED APPLICATION(S)

This application claims the benefit under 35 U.S.C. § 119 to Korean Patent Application No. 10-2023-0063131, filed on May 16, 2023, in the Korean Intellectual Property Office, the disclosure of which is incorporated by reference for all purposes.

BACKGROUND

1. Field

The following disclosure relates to a lamp system, and more particularly, to a communication lamp system.

2. Description of Related Art

A communication lamp system refers to a communication lamp system operated based on various information rather than simply turning on and off a lamp. In detail, the communication lamp system may display a state of a moving object as a text or an icon on a road, thus allowing its communication with a pedestrian. In addition, as the communication lamp is commercialized, an entertainment function of the communication lamp is increasingly strengthened, thus causing an original equipment (OE) requirement for reproducing sound along with a video.

Meanwhile, as shown in FIGS. 1A and 1B, a speaker (of FIG. 1A) and a microphone (of FIG. 1B) may be conventionally required to implement audio. In addition, opening holes respectively for outputting and inputting sound may be required to mount the speaker and the microphone. In addition, from a circuit perspective, there has been no case of using an audio circuit for outputting the sound.

Related art includes U.S. Pat. No. 11,320,829, entitled "Battery powered artificial intelligence autonomous patrol vehicle," and published on Aug. 5, 2021.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect of the disclosure, a communication lamp system includes a light source unit including a lens and a light source, a piezoelectric element for generating an electrical acoustic signal based on sound, and a processor configured to: control the light source device, the piezoelectric element, or a combination thereof; and control the light source unit based on the electrical acoustic signal received from the piezoelectric element.

The piezoelectric element may be positioned on a surface of the lens, and the piezoelectric element may vibrate and generate the electrical acoustic signal as the lens is vibrated due to the sound.

The system may further include an analog to digital (A/D) converter for converting the electrical acoustic signal into a digital signal, and the processor may further be configured to: receive the digital signal, the digital signal being an output of the A/D converter; and analyze the digital signal based on a preset voice recognition algorithm.

The processor may further be configured to: control an output of the light source unit based on the analyzed digital signal; map the digital signal and a number of outputs of the at least one light source; and control the output of the light source unit based on a mapping result.

In another aspect of the disclosure, a communication lamp system includes a light source unit including a lens and a light source, a piezoelectric element for generating sound based on an electrical acoustic signal, and a processor configured to: control the light source unit, the piezoelectric element, or a combination thereof; and control the light source unit and the piezoelectric element based on the received electrical acoustic signal.

The piezoelectric element may be positioned on a surface of the lens, and the piezoelectric element may be configured to vibrate and generate the sound as the lens is vibrated based on the received electrical acoustic signal.

The system may further include a digital to analog (D/A) converter configured to: convert a digital signal, which is an output of the processor, into the electrical acoustic signal; and transmit the converted electrical acoustic signal to the piezoelectric element, and the processor may: output the digital signal by inserting a synchronization signal into the digital signal; feed back the digital signal into which the synchronization signal is inserted; and synchronize the fed-back digital signal with output of the light source unit.

The system may further include a filter for receiving an output of the D/A converter, the filter configured to pass only a frequency of a predetermined standard or a frequency below the predetermined standard.

The processor may further be configured to: receive feedback on the digital signal and analyze sound intensity, and control an output pattern of the light source unit based on the analyzed sound intensity.

In yet another general aspect of the disclosure, a communication lamp system may include: a light source unit including a lens and a light source; a piezoelectric element generating an electrical acoustic signal based on sound, generating the sound based on the electrical acoustic signal, or a combination thereof; and a processor is configured to: control the light source unit, the piezoelectric element, or a combination thereof; and to control the light source unit based on the electrical acoustic signal received from the piezoelectric element, or control the light source unit and the piezoelectric element based on the received electrical acoustic signal.

The piezoelectric element may be positioned on a surface of the lens, and the piezoelectric element may vibrate and generate the electrical acoustic signal as the lens is vibrated due to the sound, or vibrate to generate the sound as the lens is vibrated due to the received electrical acoustic signal.

The system may further include a switch positioned at one end of the piezoelectric element, wherein the switch controls an output of the piezoelectric element.

The processor may further receive a surrounding noise signal from the piezoelectric element, and output a signal having a phase opposite to the surrounding noise signal based on the surrounding noise signal.

The piezoelectric element may be positioned in a thin portion of the lens.

The piezoelectric element may include a microphone that inputs sound to generate the electrical acoustic signal.

The piezoelectric element includes a speaker that generates sound based on the electrical acoustic signal.

The lens may include an outer lens positioned outside of the light source.

The piezoelectric element may be positioned on a surface of the outer lens.

The piezoelectric device may be positioned in or on the lens and vibrate in unison with vibration of the lens.

DETAILED DESCRIPTION

In order to describe the present disclosure, operational advantages of the present disclosure, and objects accomplished by embodiments of the present disclosure, the embodiments of the present disclosure are hereinafter exemplified and described with reference to the accompanying drawings.

First, terms used in this application are used only to describe specific embodiments rather than limiting the present disclosure, and a term of a singular number may include its plural number unless explicitly indicated otherwise in the context. In addition, it is to be understood that a term "include," "have", or the like used in this application specifies the existence of features, numerals, steps, operations, components, parts, or combinations thereof, which are mentioned in the specification, and does not preclude the existence or addition of one or more other features, numerals, steps, operations, components, parts, or combinations thereof.

When it is decided that the detailed description of the known configuration or function related to the present disclosure may obscure the gist of the present disclosure, the detailed description thereof will be omitted.

Figure 1A:
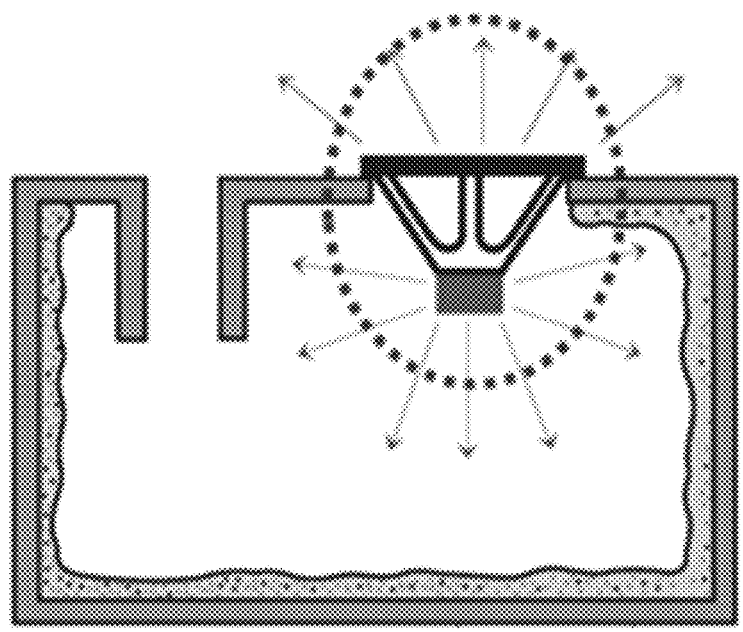
FIGS. 1A and 1B are schematic views showing conventional audio implementation methods.
Figure 1B:
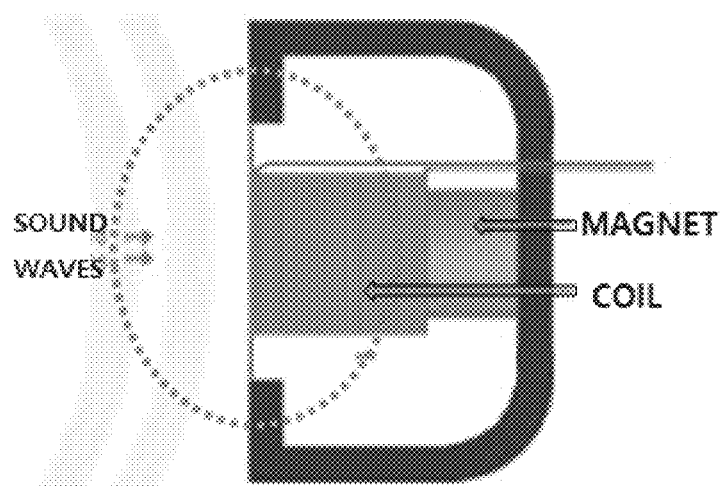
Figure 2:
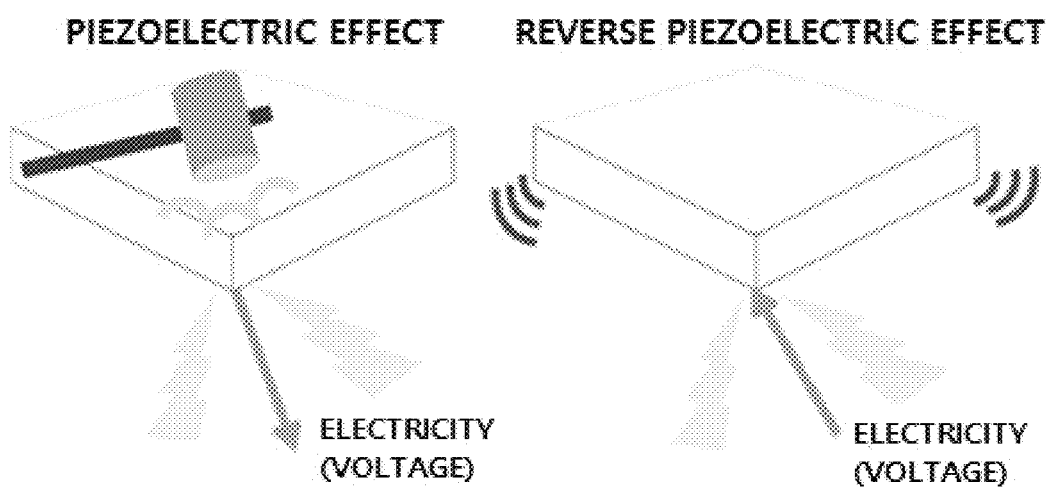
FIG. 2 is a schematic view showing the piezoelectric effect and reverse piezoelectric effect of a piezoelectric element used in the present disclosure.

FIG. 2 is a schematic view showing the piezoelectric effect and reverse piezoelectric effect of a piezoelectric element used in the present disclosure.

In general, piezoelectric elements 110 and 120 may be contracted or expanded to be vibrated as an electric signal is input thereto, and conversely, may generate the electric signal when vibration is input thereto. Through the piezoelectric element, sound may be output, and conversely, the sound may be input.

An outer lens 220 may be vibrated due to the sound generated around a communication lamp system 1000 according to the present disclosure, and the vibration may be transmitted to a piezoelectric element 110 to generate an analog signal.

Therefore, the sound may not only be output but also be input through the piezoelectric element 110.

Figure 3:
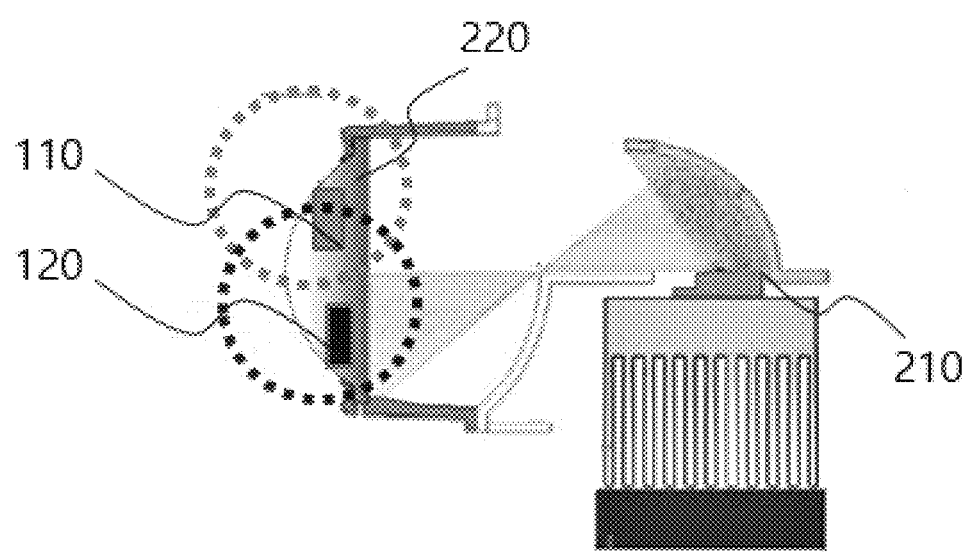
FIG. 3 is a schematic view showing a communication lamp system based on input and output of sound according to an embodiment of the present disclosure.

FIG. 3 is a schematic view showing the communication lamp system based on input and output of sound according to an embodiment of the present disclosure.

As shown in FIG. 3, the plurality of piezoelectric elements 110 and 120 may be provided, and each piezoelectric element may receive or output the sound.

However, this case is only an embodiment, and the number of piezoelectric elements 110 and 120 are not limited. The sound may be input and output through one piezoelectric element 110 or 120. This configuration is described below again with reference to FIG. 10.

Figure 4:
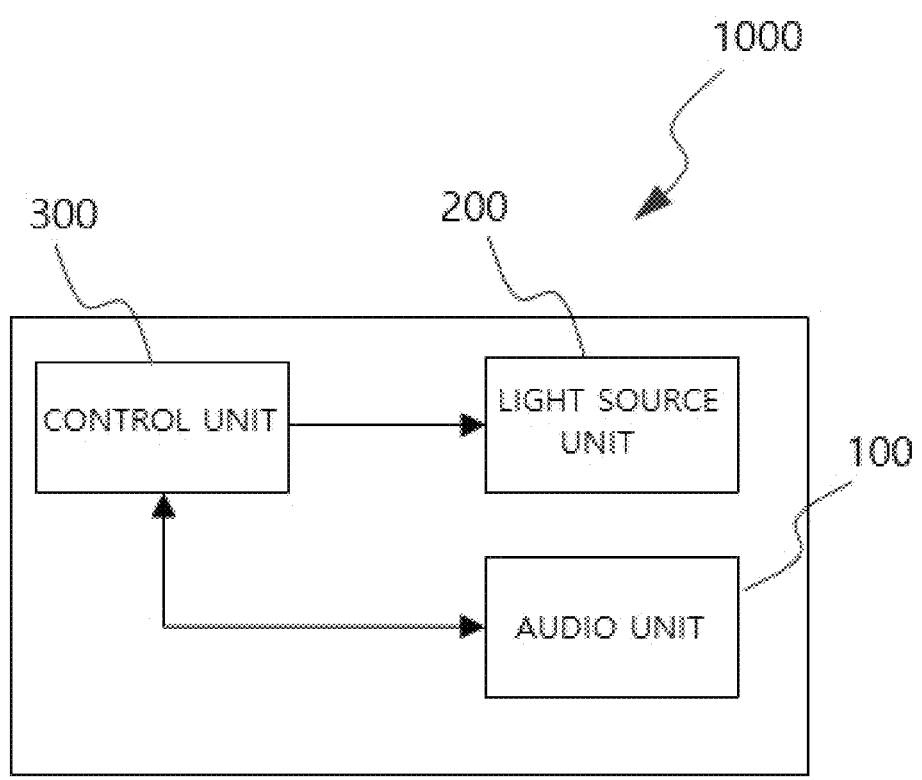
FIG. 4 is a schematic view showing the communication lamp system according to an embodiment of the present disclosure.

FIG. 4 is a schematic view showing the communication lamp system according to an embodiment of the present disclosure.

As shown in FIG. 4, the communication lamp system 1000 according to the present disclosure may include a light source unit 200 (e.g., a light source device), an audio unit 100 (e.g., a speaker, a microphone, etc.), and a control unit 300 (e.g., a processor).

The light source unit 200 may include at least one light source 210 and at least one lens 220.

The audio unit 100 may generate an electrical acoustic signal based on the sound.

The control unit 300 may control an output of the light source unit 200 based on the electrical acoustic signal received from the audio unit 100.

In detail, the lens 220 may be the outer lens 220, and the outer lens 220 described below in detail may refer to an object which may be vibrated.

In addition, the outer lens 220 refers to a lens positioned on the outside of the light source 210.

In addition, the audio unit 100 may include at least one piezoelectric element 110, and the piezoelectric element 110 may be positioned on a surface of the outer lens 220.

Accordingly, the piezoelectric element 110 may be vibrated together when the outer lens 220 is vibrated due to the sound to generate the analog signal which is an electrical acoustic signal.

Figure 5:
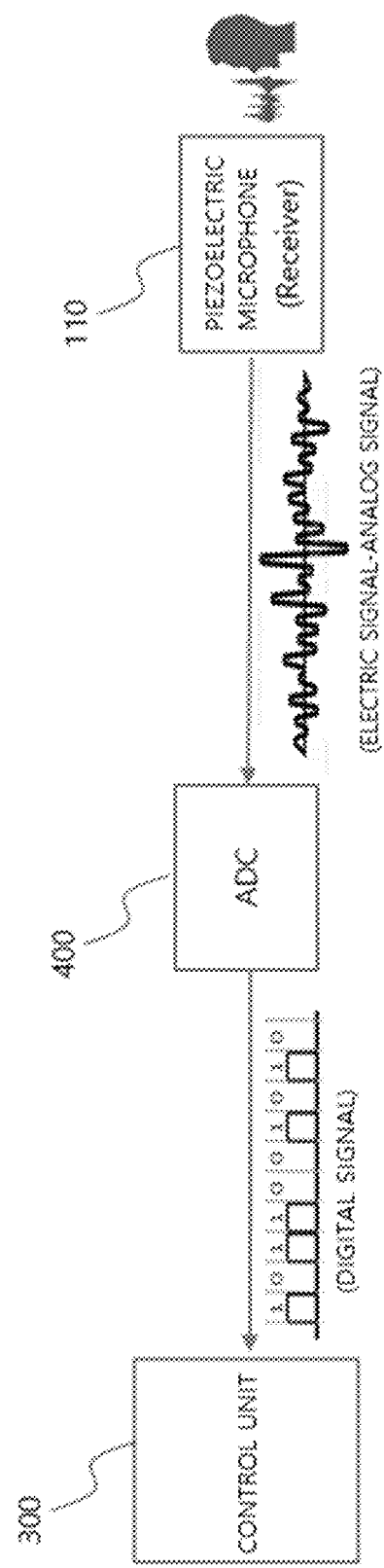
FIG. 5 is a schematic view showing a voice recognition method according to another embodiment of the present disclosure.

FIG. 5 is a schematic view showing a voice recognition method according to another embodiment of the present disclosure.

As shown in FIG. 5, the control unit 300 may control the output of the light source unit 200 based on an output of the audio unit 100.

Hereinafter, the description describes a control method of the output of the light source unit 200 based on the output of the audio unit 100.

Prior hereto, the communication lamp system 1000 according to the present disclosure may further include an analog to digital (A/D) converter 400.

The A/D converter 400 is a device that converts the analog signal, which is the electrical acoustic signal, into a digital signal. The A/D converter 400 may receive the analog signal to output the digital signal when the analog signal is generated by the piezoelectric element 110 vibrated as the outer lens 220 is vibrated.

Here, the control unit 300 may receive the converted digital signal, and analyze the digital signal based on a preset voice recognition algorithm.

In addition, the control unit 300 may control the output of the light source unit 200 based on the digital signal.

Figure 6:
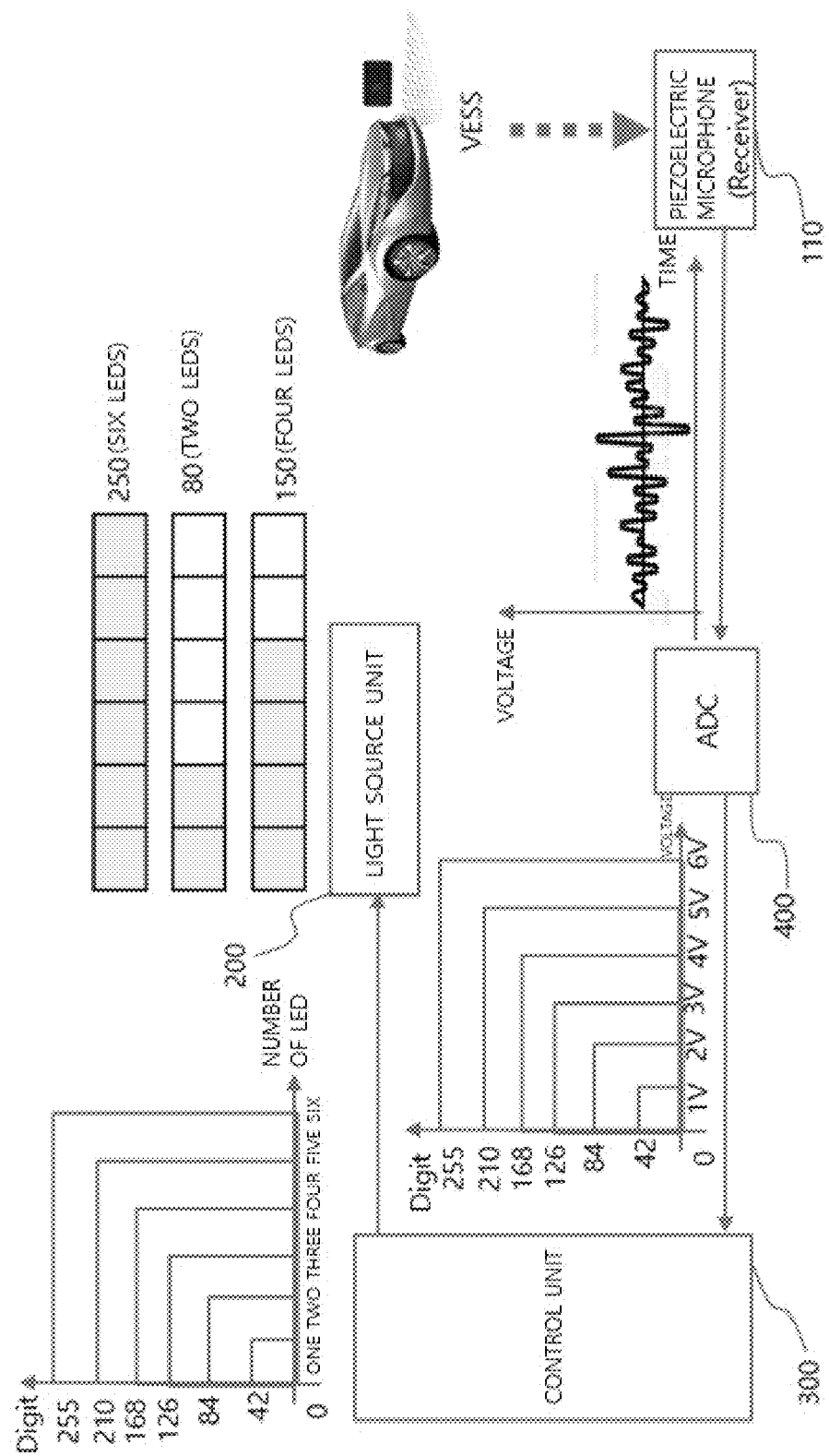
FIG. 6 is a schematic view showing a light source control method according to another embodiment of the present disclosure.

FIG. 6 is a schematic view showing a light source control method according to another embodiment of the present disclosure.

As shown in FIG. 6, the control unit 300 may control the plurality of light sources based on a vibration level of the piezoelectric element 110.

In detail, when noise or sound occurs in a vehicle body, the piezoelectric element 110 may detect vibration generated on the surface of the outer lens 220, and the control unit 300 may control the plurality of light sources based on the vibration level of the piezoelectric element 110 that is generated thereby.

In more detail, the control unit 300 may control a light source pattern by driving the light source based on a rhythm or the vibration of the lens due to noise and displaying the same on the light source.

For example, the control unit 300 may drive the light source based on a rhythm of a virtual engine sound generated by a virtual engine sound system (VESS), and drive the light source based on vibration of the sound that is generated on the outer lens 220 itself.

The description hereinabove specifically describes a method in which the piezoelectric element 110 functions as a microphone and inputs the sound to generate the electrical acoustic signal in the communication lamp system 1000 of the present disclosure.

The description hereinafter specifically describes a method in which the piezoelectric element 110 functions as a speaker and generates the sound based on the electrical acoustic signal in the communication lamp system 1000 of the present disclosure.

A configuration thereof is the same as that of FIG. 4, and FIG. 4 may thus be referred thereto. However, there are some differences in functions, and the functions are thus explained below.

The light source unit 200 may include at least one light source 210 and at least one lens 220.

The audio unit 100 may generate the sound based on the electrical acoustic signal.

The control unit 300 may control the light source unit 200 or the audio unit 100.

In detail, the control unit 300 may control the light source unit 200 or the audio unit 100 based on the received electrical acoustic signal.

Here, the lens 220 may be the outer lens 220, and the outer lens 220 described below in detail may refer to the object which may be vibrated.

In addition, the outer lens 220 refers to the lens positioned on the outside of the light source 210.

In addition, the audio unit 100 may include at least one piezoelectric element 120, and the piezoelectric element 120 may be positioned on the surface of the outer lens 220.

Accordingly, the piezoelectric element 120 may be vibrated to generate the sound as the lens 220 is vibrated due to the electrical acoustic signal.

In addition, the communication lamp system 1000 according to the present disclosure may further include a digital to analog (D/A) converter 500.

The D/A converter 500 is a device that converts the digital signal into the analog signal, which is the electrical acoustic signal, and may receive the digital signal output by the control unit 300 to output the analog signal.

In addition, the sound may be output as the converted analog signal vibrates the piezoelectric element 120.

Figure 7:
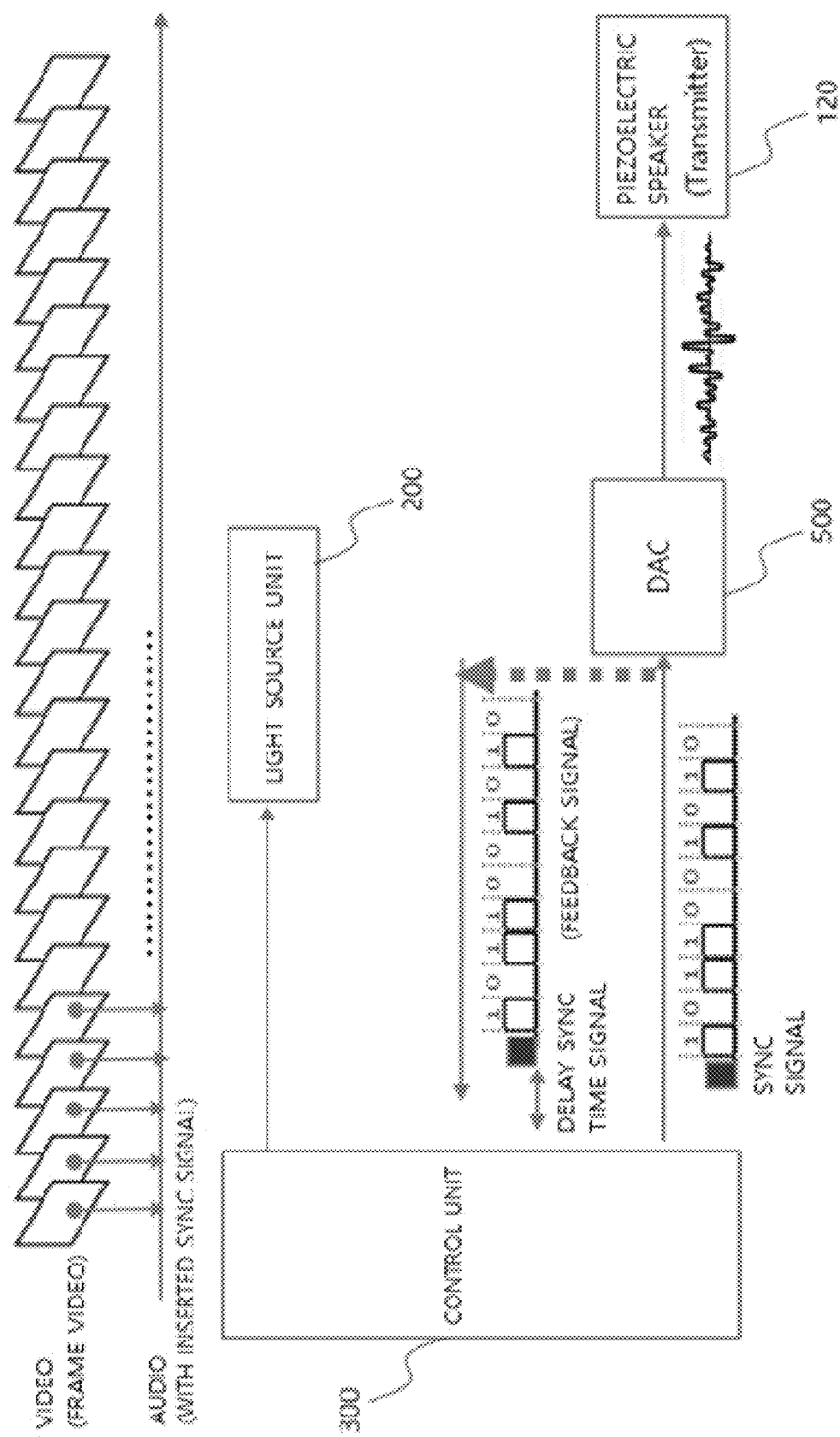
FIG. 7 is a schematic view showing a synchronization process of a video signal and an audio signal according to another embodiment of the present disclosure.

FIG. 7 is a schematic view showing a synchronization process of a video signal and the audio signal according to another embodiment of the present disclosure.

The control unit 300 may not include a codec that collectively refers to a coder converting the audio or video signal into the digital signal and a decoder converting the vice versa. In this case, video data and audio data may be required to be driven separately from each other, and to this end, the video audio data may be required to be driven in synchronization.

Therefore, the control unit 300 may output the digital signal by inserting a sync signal, which is a synchronization signal, into the digital signal. In addition, the control unit 300 may feed back the output digital signal to be synchronized with the video signal, thus synchronizing the fed-back digital signal with the output of the light source unit 200.

Figure 8:
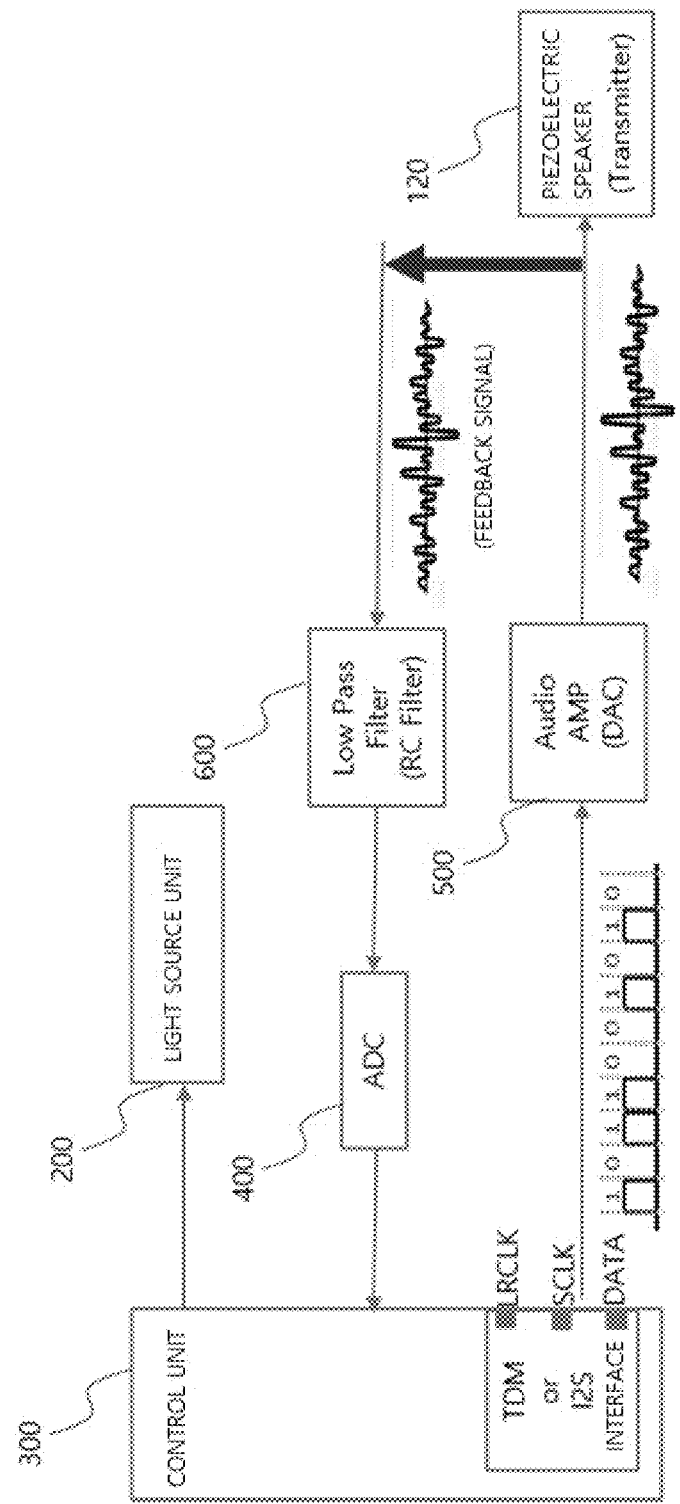
FIG. 8 is a schematic view showing a sound output method according to another embodiment of the present disclosure.

FIG. 8 is a schematic view showing a sound output method according to another embodiment of the present disclosure.

The communication lamp system 1000 may further include a filter 600 according to another embodiment of the present disclosure.

The filter 600 may receive the analog signal, which is output of the D/A converter 500, as a feedback signal.

The filter 600 may be a low pass filter (LPF). Accordingly, only a signal passing only a frequency of a predetermined standard or below by adjusting a voltage level and removing high-frequency noise may be input to the A/D converter 400.

In other words, the control unit 300 may receive feedback on the analog signal output from the D/A converter 500, estimate a sound pressure of the sound through this feedback, and control the light source based on this estimation.

Figure 9:
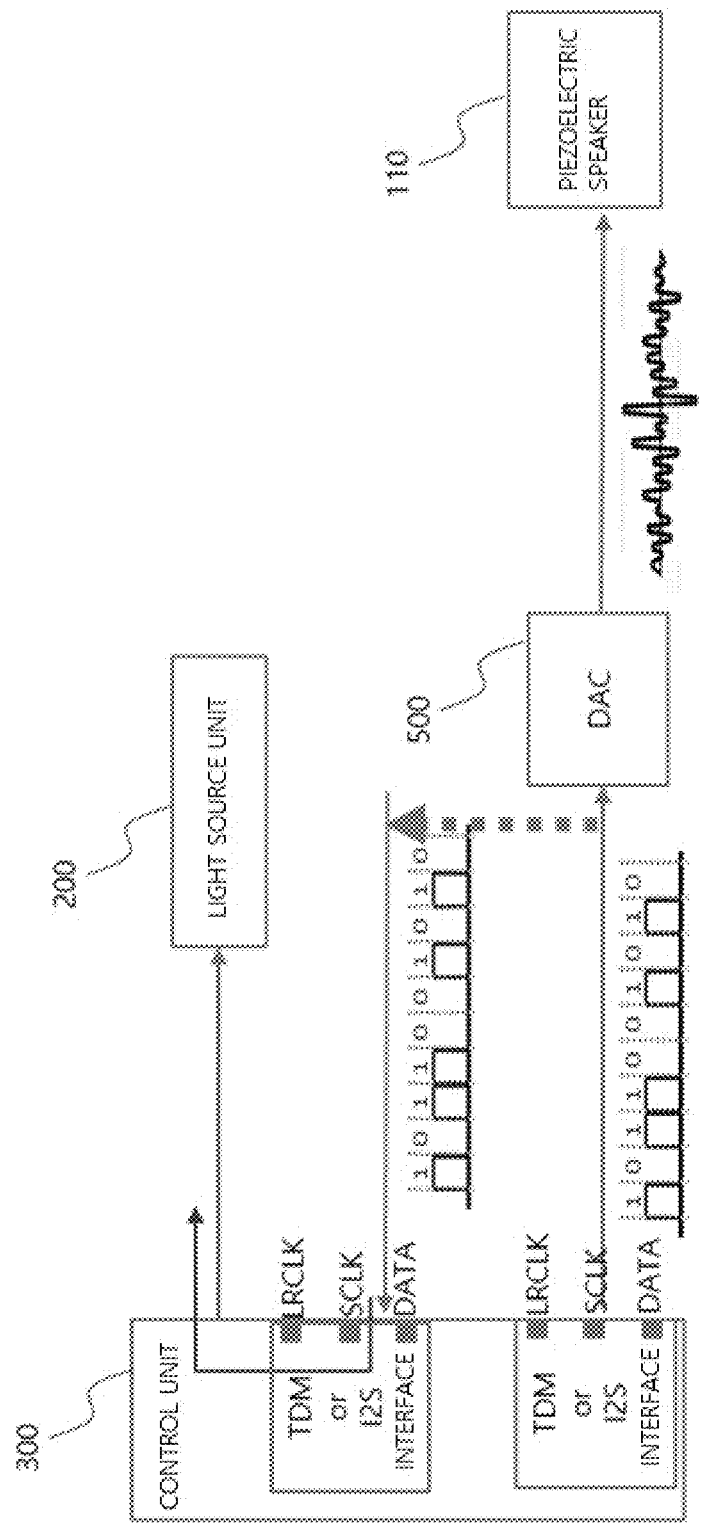
FIG. 9 is a schematic view showing a sound output method and a light source control method according to another embodiment of the present disclosure.

FIG. 9 is a schematic view showing a sound output method and a light source control method according to another embodiment of the present disclosure.

The control unit 300 may analyze sound intensity by receiving feedback on the digital signal to control the light source based on a sound rhythm.

In detail, the control unit 300 may receive the feedback on the output digital signal, and analyze the sound intensity based on the fed-back digital signal.

In addition, the control unit 300 may control an operation of the light source based on the analyzed sound intensity.

Here, the control unit 300 may include a digital audio interface.

In more detail, the control unit 300 may receive feedback on data line for the sound output. The commonly-used digital audio interface may include time division multiplexing (TDM) and inter-integrated circuit (IC) sound (12S), which have two clock (CLK) lines as well as data.

Therefore, the control unit 300 may decode accurate data based on a clock to decode the output data when not only the data line but also all pins related to the corresponding interface receive the feedback.

Meanwhile, the piezoelectric element 110 or 120 included in the communication lamp system 1000 according to another embodiment of the present disclosure may simultaneously function as the microphone and the speaker even with one piezoelectric element without a need for the plurality of piezoelectric elements to be simultaneously included.

A configuration thereof is the same as that of FIG. 4, and FIG. 4 may thus be referred thereto. However, there are some differences in functions, and the functions are thus explained below.

The light source unit 200 may include at least one light source 210 and at least one lens 220.

The audio unit 100 may generate the electrical acoustic signal based on the sound, or generate the sound based on the electrical acoustic signal.

The control unit 300 may control the light source unit 200 or the audio unit 100.

In detail, the control unit 300 may control the output of the light source unit 200 based on the electrical acoustic signal received from the audio unit 100, or control the light source unit 200 or the audio unit 100 based on the received electrical acoustic signal.

Here, the lens 220 may be the outer lens 220, and the outer lens 220 described below in detail may refer to the object which may be vibrated.

In addition, the outer lens 220 refers to the lens positioned on the outside of the light source 210.

In addition, the audio unit 100 may include at least one piezoelectric element 110 or 120, and the piezoelectric element 110 or 120 may be positioned on the surface of the outer lens 220.

Accordingly, the piezoelectric element 110 or 120 may generate the electrical acoustic signal based on the vibration caused by the vibration of the lens 220 generated due to the sound, or generate the sound by being vibrated based on the vibration of the lens 220 caused by the electrical acoustic signal.

Figure 10:
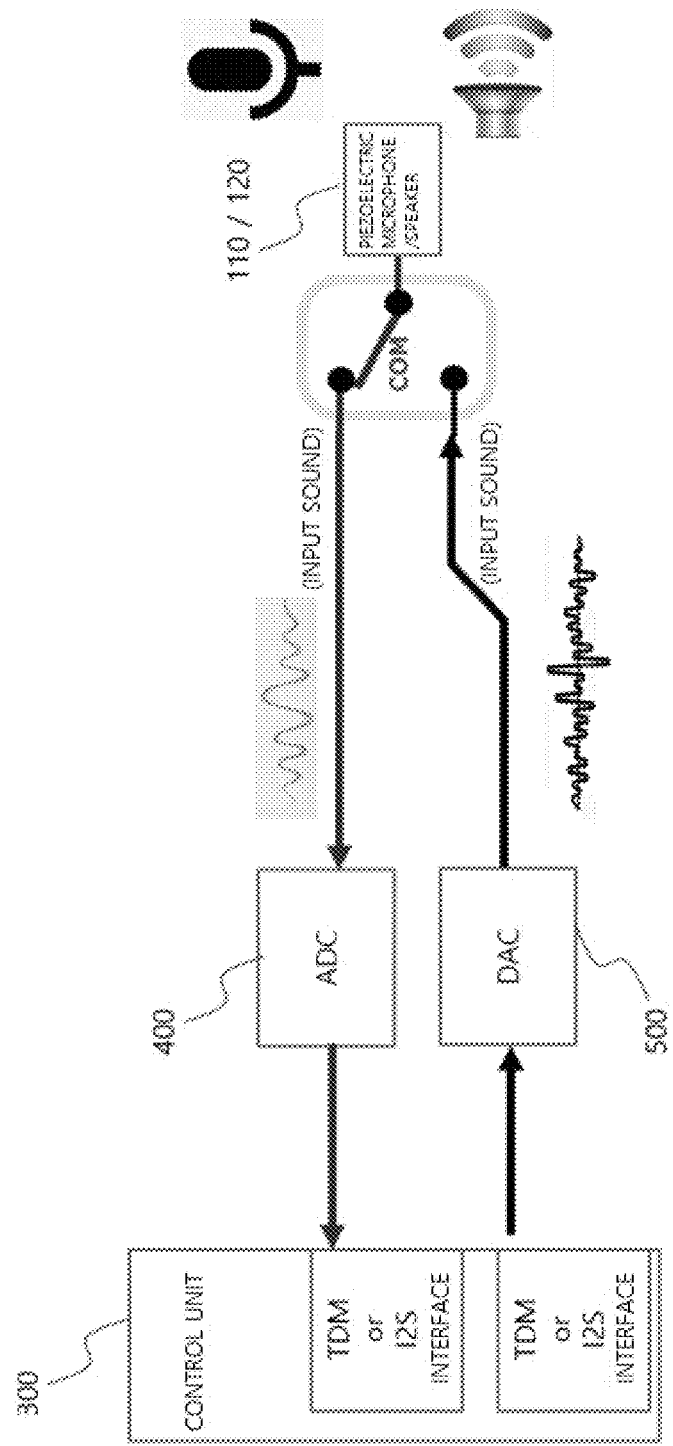
FIG. 10 is a schematic view showing a communication lamp system according to another embodiment of the present disclosure.

FIG. 10 is a schematic view showing a communication lamp system according to another embodiment of the present disclosure.

As the piezoelectric effect and reverse piezoelectric effect of the piezoelectric element 110 or 120 are described above, the piezoelectric element 110 or 120 may generate electricity when the vibration is applied thereto, and may generate the vibration when electricity is applied thereto.

Accordingly, the sound may be input and output using only one piezoelectric element 110 or 120 rather than using the plurality of piezoelectric elements 110 and 120.

To this end, the communication lamp system 1000 may further include a switch S according to another embodiment of the present disclosure.

The switch S may be positioned at one end of the piezoelectric element 110 or 120, and the control unit 300 may select a path for inputting or outputting the sound by controlling the switch S.

Figure 11:
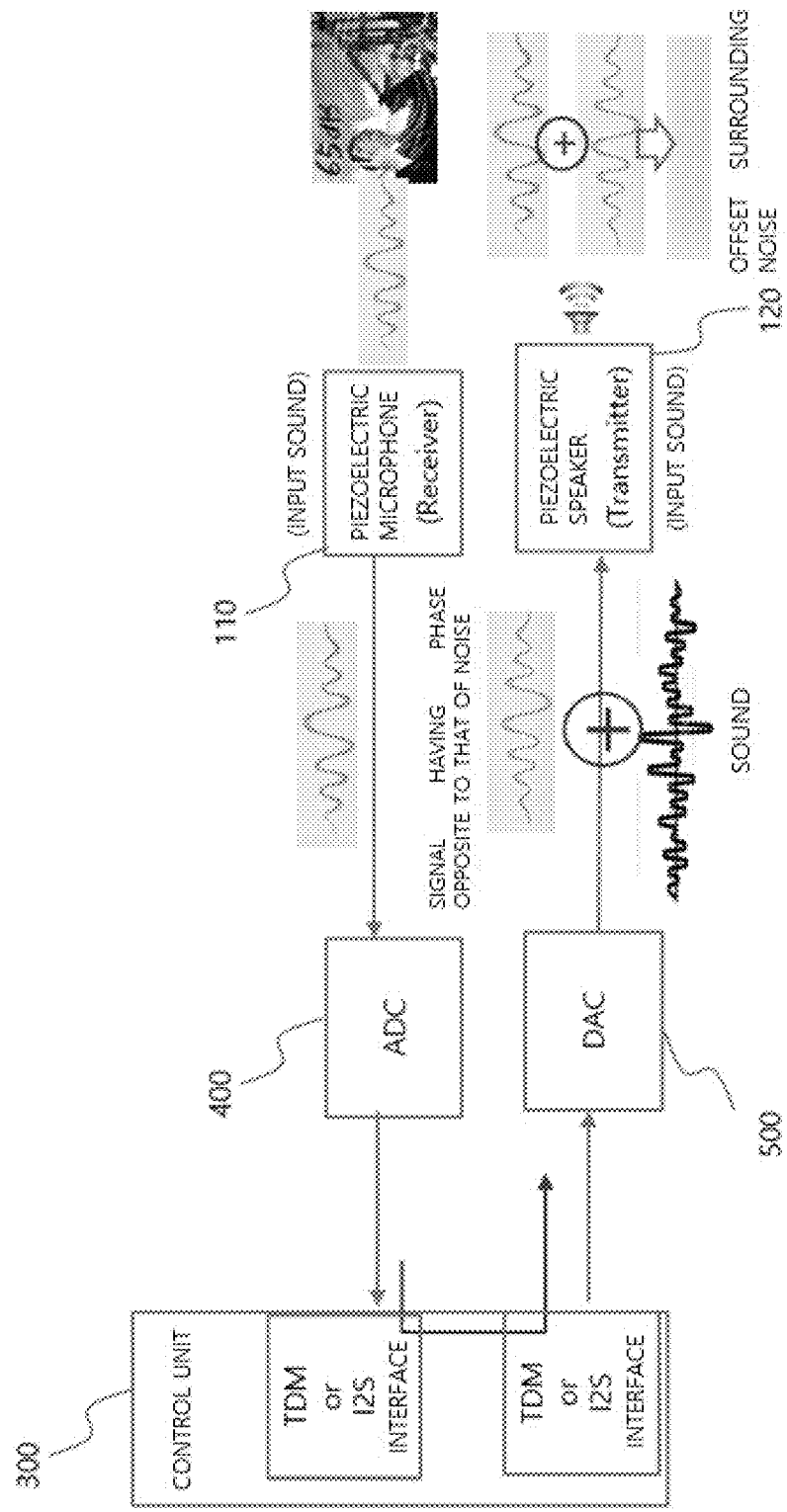
FIG. 11 is a schematic view showing a noise canceling method according to another embodiment of the present disclosure.

FIG. 11 is a schematic view showing a noise canceling method according to another embodiment of the present disclosure.

When surrounding noise is severe, it may be difficult to detect the output audio signal, and it is thus necessary to output the sound more clearly.

To this end, the control unit 300 may receive the surrounding noise, and generate and output a signal having a phase opposite to the surrounding noise.

In detail, a piezoelectric element for inputting the sound is referred to as the first piezoelectric element 110, and a piezoelectric element for outputting the sound is referred to as the second piezoelectric element 120.

The first piezoelectric element 110 may generate the analog signal based on the vibration of the outer lens 220, and the analog signal referred to here may be the surrounding noise.

The analog signal may be converted into the digital signal through the A/D converter 400 and then input to the control unit 300.

In addition, the control unit 300 may output the signal having an opposite phase based on the input digital signal as well as the audio signal.

The plurality of signals (or the signal having an opposite phase and the audio signal) may be converted into the analog signals again through the D/A converter 500, and then combined with each other to be output through the second piezoelectric element 120.

It is thus possible to increase clarity of the sound to be output by offsetting the surrounding noise.

The description here describes the first piezoelectric element 110 and the second piezoelectric element 120 as separate elements. However, this configuration is described only to help understanding of the present disclosure and does not necessarily limit the number of piezoelectric elements to two. It is apparent that the above-described functions may be performed by one piezoelectric element 110 or 120.

Figure 12:
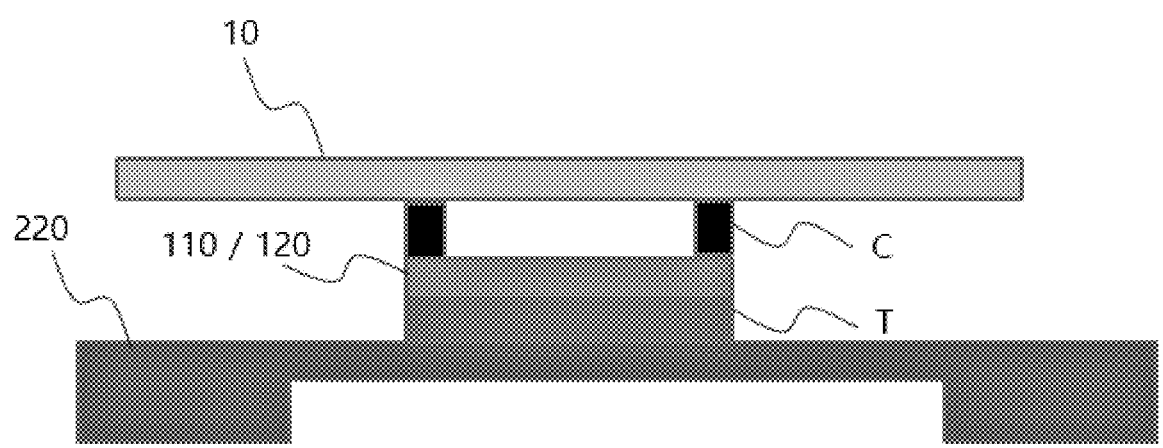
FIG. 12 is a schematic view showing a mounting structure of a piezoelectric element according to another embodiment of the present disclosure.

FIG. 12 is a schematic view showing a mounting structure of the piezoelectric element according to another embodiment of the present disclosure.

As described above, in order for the piezoelectric element 110 or 120 to detect the vibration input from the outer lens 220, the piezoelectric element 110 or 120 may be required to be in close contact with the outer lens 220.

Therefore, the piezoelectric element 110 or 120 may be positioned in a thin portion of the outer lens 220 for the piezoelectric element 110 or 120 to sensitively receive the vibration of the outer lens 220.

In addition, the present disclosure may further include a cushioning material to bring the piezoelectric element 110 or 120 into close contact with the outer lens 220.

Here, the cushioning material may be a cushion C, and may be positioned between the piezoelectric element 110 or 120 and a rear housing 10 positioned outside the piezoelectric element 110 or 120.

In this way, the piezoelectric element 110 or 120 may be brought into closer contact with the outer lens 220.

Meanwhile, even when data having a constant sound pressure is transmitted across all frequency bands through a digital sound source, a frequency response feature may be different in a final state of the outer lens 220 due to a difference in the individual piezoelectric element 110 or 120, differences in a location of a contact surface and a material of the outer lens 220, and a difference in a physical structure, or the like.

Figure 13:
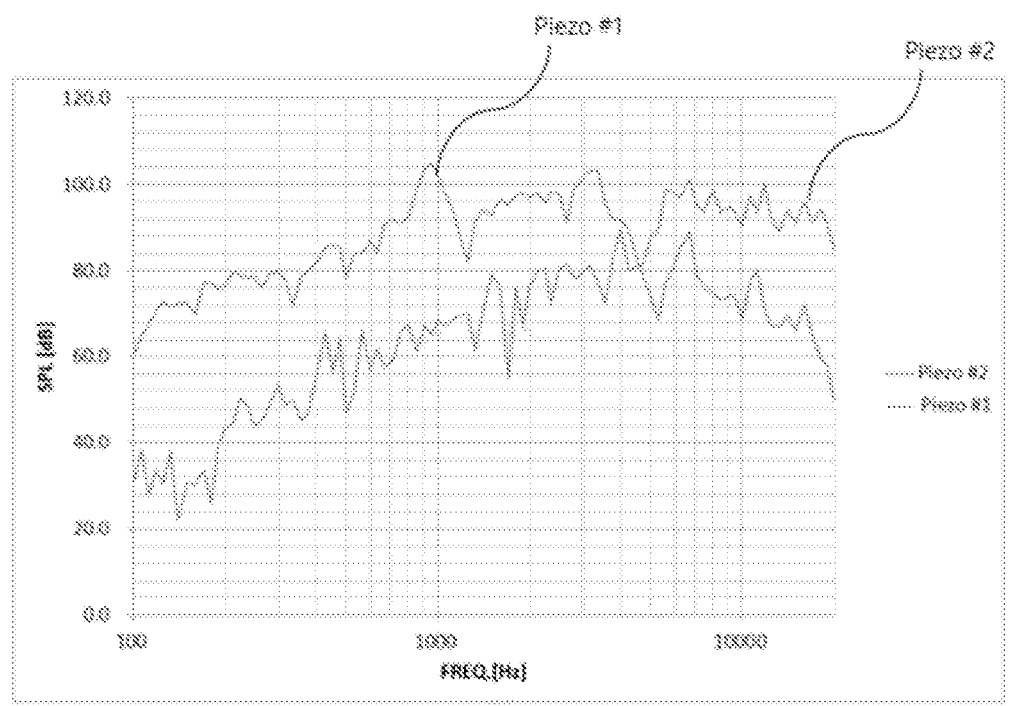
FIG. 13 is a graph showing a frequency response feature based on an individual piezoelectric element.

FIG. 13 is a graph showing a frequency response feature based on the individual piezoelectric element.

Figure 14:
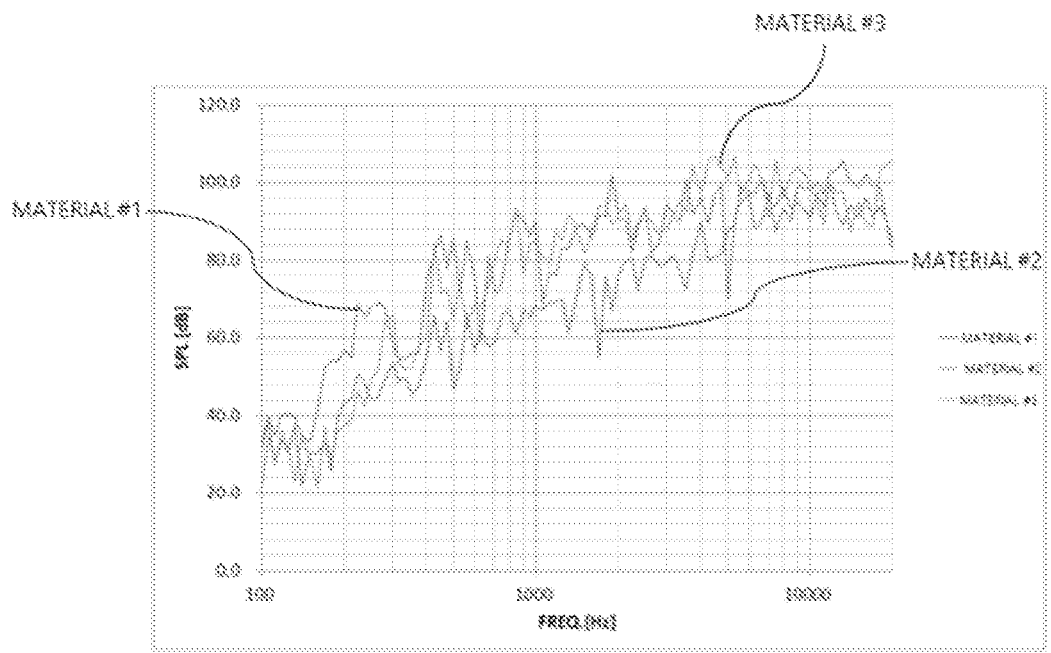
FIG. 14 is a graph showing a frequency response feature based on a material of an outer lens.

FIG. 14 is a graph showing a frequency response feature based on a material of the outer lens.

Figure 15:
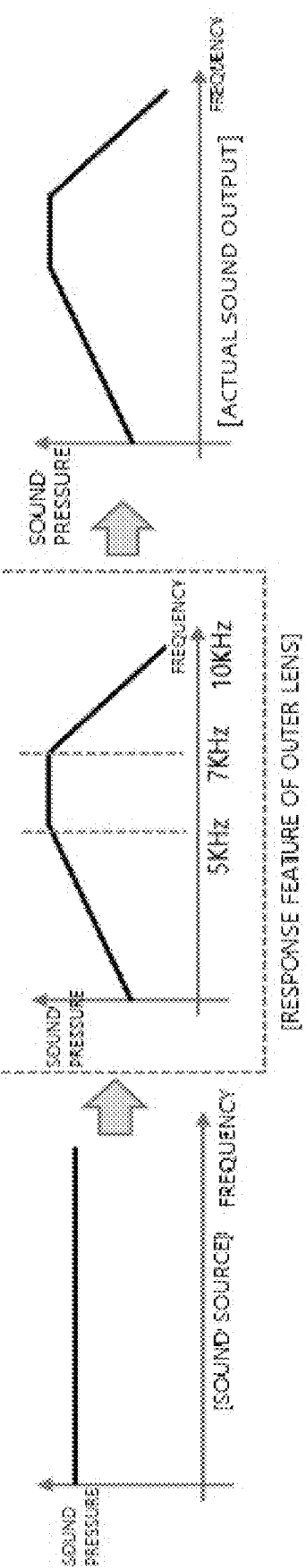
FIG. 15 is a graph showing a sound output process based on a response feature of the outer lens.

FIG. 15 is a graph showing a sound output process based on a response feature of the outer lens.

Figure 16:
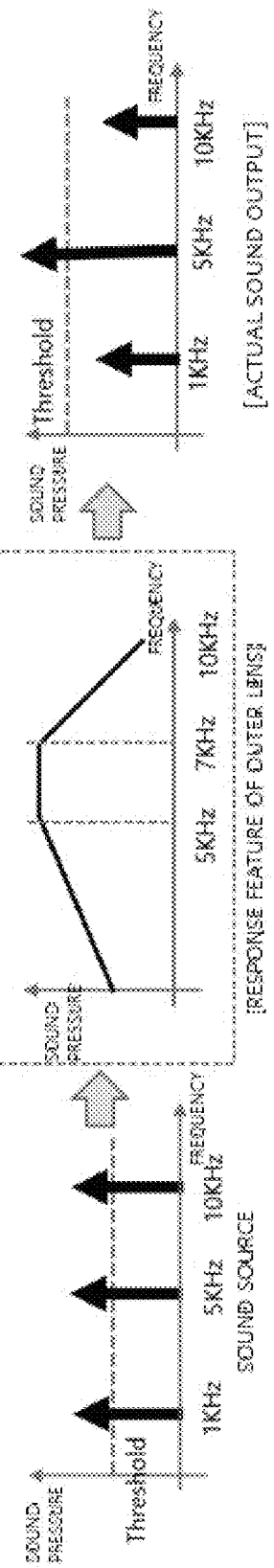
FIG. 16 is a graph showing a sound pressure level based on the response feature of the outer lens.

FIG. 16 is a graph showing a sound pressure level based on the response feature of the outer lens.

As shown in FIG. 13 or 14, it may be seen that the frequency response feature is changed based on the difference in the individual piezoelectric element 110 or 120 or the material of the outer lens 220 to change an output sound level.

In addition, as shown in FIG. 15, it may be seen that the sound pressure is decreased at low and high frequencies even when the data has the constant sound pressure upon viewing the frequency response feature of the outer lens 220, and the sound pressure level is decreased in the low and high frequency bands in the actual sound output based on this frequency response feature.

In addition, as shown in FIG. 16, each frequency may have the same sound pressure level. Therefore, even when the frequency exceeds all specified thresholds, the frequency response feature of the outer lens 220 shows the decrease in the sound pressure in the low and high frequency bands, which may be seen from the response feature of the outer lens, for example, 1 KHz and 10 KHz tones do not exceed the specified threshold.

Therefore, the light source may be controlled with a sound pressure that is closest to what a person actually hears only by finally measuring a vibration level of the outer lens 220.

As set forth above, the communication lamp system according to the various embodiments of the present disclosure as described above may strengthen the entertainment function of the moving object by enabling the input and output of the sound with only one piezoelectric element.

In detail, the communication lamp system may output the active sound by inputting the vibration into one piezoelectric element.

Although the embodiments of the present disclosure are described as above, the embodiments disclosed in the present disclosure are provided not to limit the spirit of the present disclosure but to fully describe the present disclosure. Therefore, the spirit of the present disclosure may include not only each disclosed embodiment but also a combination of the disclosed embodiments. Further, the scope of the present disclosure is not limited to these embodiments. In addition, it is apparent to those skilled in the art to which the present disclosure pertains that various variations and modifications could be made without departing from the sprit and scope of the appended claims, and all such appropriate variations and modifications should be considered as falling within the scope of the present disclosure as equivalents.

What is claimed is:

1. A communication lamp system comprising:
a light source unit including a lens and a light source;
a piezoelectric element for generating an electrical acoustic signal based on sound; and
a processor configured to:
control the light source unit, the piezoelectric element, or a combination thereof; and
control the light source unit based on the electrical acoustic signal received from the piezoelectric element,
wherein the piezoelectric element is positioned on a surface of the lens, and
wherein the piezoelectric element is configured to vibrate and generate the electrical acoustic signal as the lens is vibrated due to the sound.

2. The system of claim 1, further comprising:
an analog to digital (A/D) converter for converting the electrical acoustic signal into a digital signal,
wherein the processor is further configured to:
receive the digital signal, the digital signal being an output of the A/D converter; and
analyze the digital signal based on a preset voice recognition algorithm.

3. The system of claim 2, wherein the processor is further configured to:
control an output of the light source unit based on the analyzed digital signal;
map the digital signal and a number of outputs of the at least one light source; and
control the output of the light source unit based on a mapping result.

4. A communication lamp system comprising:
a light source unit including a lens and a light source;
a piezoelectric element for generating sound based on an electrical acoustic signal; and
a processor is configured to:
control the light source unit, the piezoelectric element, or a combination thereof; and
control the light source unit and the piezoelectric element based on the received electrical acoustic signal,
wherein the piezoelectric element is positioned on a surface of the lens, and
wherein the piezoelectric element is configured to vibrate and generate the sound as the lens is vibrated based on the received electrical acoustic signal.

5. The system of claim 4, further comprising:
a digital to analog (D/A) converter configured to:
convert a digital signal, which is an output of the processor, into the electrical acoustic signal; and
transmit the converted electrical acoustic signal to the piezoelectric element,
wherein the processor is further configured to:
output the digital signal by inserting a synchronization signal into the digital signal;
feed back the digital signal into which the synchronization signal is inserted; and
synchronize the fed-back digital signal with output of the light source unit.

6. The system of claim 5, further comprising a filter for receiving an output of the D/A converter, the filter configured to pass only a frequency of a predetermined standard or a frequency below the predetermined standard.

7. The system of claim 5, wherein the processor is further configured to:
receive feedback on the digital signal and analyze sound intensity, and
control an output pattern of the light source unit based on the analyzed sound intensity.

8. A communication lamp system comprising:
a light source unit including a lens and a light source;
a piezoelectric element generating an electrical acoustic signal based on sound, generating the sound based on the electrical acoustic signal, or a combination thereof; and
a processor is configured to:
control the light source unit, the piezoelectric element, or a combination thereof; and
control the light source unit based on the electrical acoustic signal received from the piezoelectric element, or control the light source unit and the piezoelectric element based on the received electrical acoustic signal,
wherein the piezoelectric element is positioned on a surface of the lens, and wherein the piezoelectric element is configured to
vibrate and generate the electrical acoustic signal as the lens is vibrated due to the sound, or
vibrate to generate the sound as the lens is vibrated due to the received electrical acoustic signal.

9. The system of claim 8, further comprising:
a switch positioned at one end of the piezoelectric element,
wherein the switch controls an output of the piezoelectric element.

10. The system of claim 9, wherein the processor is further configured to:
receive a surrounding noise signal from the piezoelectric element; and
output a signal having a phase opposite to the surrounding noise signal based on the surrounding noise signal.

11. The system of 8, wherein the piezoelectric element is positioned in a thin portion of the lens.

12. The system of claim 8, wherein the piezoelectric comprises a microphone that inputs sound to generate the electrical acoustic signal.

13. The system of claim 8, wherein the piezoelectric element comprises a speaker that generates sound based on the electrical acoustic signal.

14. The system of claim 8, wherein lens comprises an outer lens positioned outside of the light source.

15. The system of claim 8, wherein the piezoelectric element is positioned on a surface of the outer lens.

16. The system of claim 8, wherein the piezoelectric element is positioned in or on the lens and configured to vibrate in unison with vibration of the lens.

* * * * *